US010120367B2

(12) United States Patent
Itakura et al.

(10) Patent No.: US 10,120,367 B2
(45) Date of Patent: Nov. 6, 2018

(54) NUMERICAL CONTROLLER PERFORMING REPETITIVE MACHINING (71) Applicant: FANUC Corporation, Minamitsuru-gun, Yamanashi (JP)

(72) Inventors: Shinichirou Itakura, Minamitsuru-gun (JP); Hideaki Maeda, Minamitsuru-gun (JP); Yorikazu Fukui, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 348 days.

(21) Appl. No.: 14/790,367

(22) Filed: Jul. 2, 2015

(65) Prior Publication Data

US 2016/0018813 A1 Jan. 21, 2016

(30) Foreign Application Priority Data

Jul. 18, 2014 (JP) .................................. 2014-147631

(51) Int. Cl.
  G06F 19/00 (2018.01)
  G05B 19/4065 (2006.01)
  G05B 19/406 (2006.01)
(52) U.S. Cl.
  CPC ....... *G05B 19/4065* (2013.01); *G05B 19/406* (2013.01); *G05B 2219/37429* (2013.01);
  (Continued)
(58) Field of Classification Search
  CPC .............. G05B 19/4065; G05B 19/406; G05B 2219/37429; G05B 2219/42281; G05B 2219/50308; Y02P 70/163
  (Continued)

(56) References Cited

U.S. PATENT DOCUMENTS 4,837,490 A   6/1989   Neko
6,291,959 B1  9/2001   Yoshida et al.
(Continued)

FOREIGN PATENT DOCUMENTS

JP   H05-111891 A   5/1993
JP   H05-040902 U   6/1993
(Continued)

OTHER PUBLICATIONS

Decision to Grant a Patent dated Dec. 20, 2016 in Japanese Patent Application No. 2014-147631 (3 pages) with an English translation (3 pages).

*Primary Examiner* — Robert Cassity
(74) *Attorney, Agent, or Firm* — Drinker Biddle & Reath LLP (57) ABSTRACT A numerical controller acquires state information (machine condition) such as the current temperature of a drive unit to determine whether a machining operation based on a machining program can be started or not by comparing the state information with a machine condition history recorded in a recording unit. If determined that the machining operation can be started, a machining operation start command is output and if determined that the machining operation cannot be started, the machine condition is monitored to withhold outputting of the machining operation start command until the machine condition allowing to start the machining operation based on the machining program appears.

3 Claims, 5 Drawing Sheets (52) U.S. Cl.
CPC .............. *G05B 2219/42281* (2013.01); *G05B 2219/50308* (2013.01)

(58) Field of Classification Search
USPC ........................................................ 700/175
See application file for complete search history.

(56) References Cited

U.S. PATENT DOCUMENTS

| | | | | |
|---|---|---|---|---|
| 2003/0065419 | A1* | 4/2003 | Fujishima | B23Q 11/0003 |
| | | | | 700/176 |
| 2006/0247795 | A1* | 11/2006 | Gass | B23D 59/001 |
| | | | | 700/1 |
| 2007/0192128 | A1* | 8/2007 | Celestini | G06Q 40/00 |
| | | | | 705/35 |
| 2010/0232982 | A1* | 9/2010 | Nakano | F04B 49/02 |
| | | | | 417/42 |
| 2014/0156057 | A1* | 6/2014 | Tong | G05B 19/4065 |
| | | | | 700/175 |
| 2016/0001410 | A1* | 1/2016 | Koyama | B23Q 11/0007 |
| | | | | 700/170 |

FOREIGN PATENT DOCUMENTS

| | | | | |
|---|---|---|---|---|
| JP | 2000-271836 A | | 10/2000 | |
| JP | 2010-102416 A | | 5/2010 | |
| JP | 2016013605 A | * | 1/2016 | ......... B23Q 11/0007 |

\* cited by examiner

MOTOR OUTPUT
CHARACTERISTIC LINE EXAMPLE

NUMERICAL CONTROLLER PERFORMING REPETITIVE MACHINING

RELATED APPLICATION DATA

This application claims priority under 35 U.S.C. § 119 and/or § 365 to Japanese Application No. 2014-147631 filed Jul. 18, 2014, the entire contents is incorporated herein by reference.

BACKGROUND OF THE INVENTION

1. Field of the Invention

The present invention relates to a numerical controller satisfying both of avoidance of overheating of a motor due to a continuous operation of a program and maintenance of machining quality.

2. Description of the Related Art

A machine tool is a machine capable of machining desired workpieces by operating according to a machining program created in advance. Accordingly, a plurality of pieces of desired workpieces can be machined by operating one machining program continuously and repeatedly.

Figure 6:
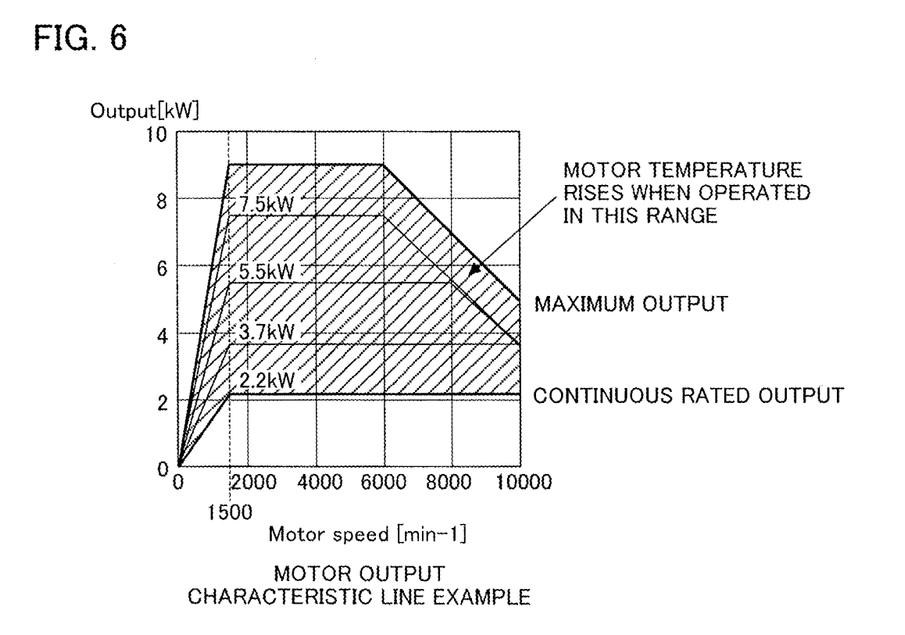
FIG. 6 is a diagram showing an example of output characteristics of a motor.

A drive motor for machine tools has, as shown in FIG. 6, a continuous rating output and a maximum output based on characteristics of the motor defined therefor. Such a drive motor is normally used within a range of the continuous rating output, but may also be used by exceeding the continuous rating output depending on an operation pattern when, for example, high-load machining is temporarily performed. This is done in the context of being able to keep costs lower than the introduction of a new machine tool of a larger continuous rating load to temporarily perform high-load machining.

However, if a machining program having a motor operation pattern exceeding the continuous rating load of a drive motor is continuously operated, the motor temperature rises gradually.

Figure 7:
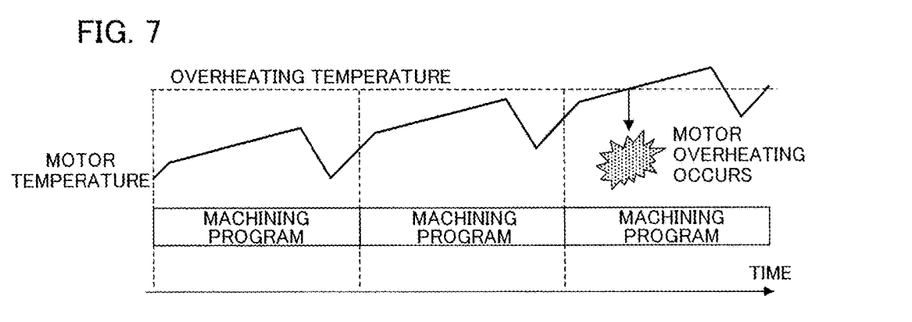
FIG. 7 is a diagram illustrating overheating of the motor due to a continuous operation of a machine tool.

FIG. 7 shows a graph showing a case where a machining program having a motor operation pattern exceeding the continuous rating load of a drive motor is continuously executed, with the vertical axis representing the motor temperature and the horizontal axis representing time. As is understood from the graph in FIG. 7, if a machining operation is performed according to a machining program having a motor operation pattern exceeding the continuous rating load, the temperature of the motor does not fall sufficiently even though the machining operation is completed and the temperature of the motor rises gradually as repetitive machining is continued, and finally, the temperature of the motor exceeds an overheating temperature and overheating occurs so that the machine stops.

Figure 8:
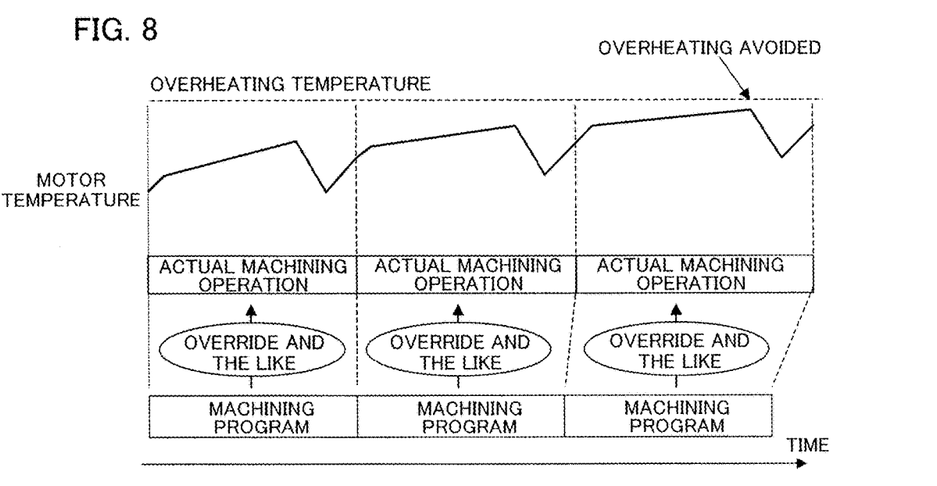
FIG. 8 is a diagram illustrating an overheating avoidance method of the motor according to a conventional technology.

To solve such a problem, for example, JP 2000-271836 A proposes a control method of a machine tool that exercises control such that overheating is prevented from arising by, when a machining program is continuously executed, as shown in FIG. 8, changing a cutting feed speed override and a time constant for acceleration/deceleration momentarily based on machine states such as the temperature of the motor to automatically adjust actual machining operation content.

Figure 9:
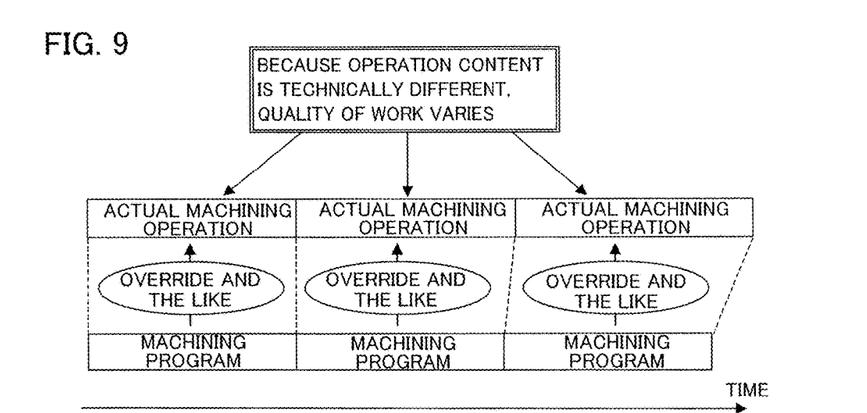
FIG. 9 is a diagram illustrating a problem of the conventional technology.

According to the above control method, however, a machining operation that is technically different from operation content instructed by an NC program is performed by a machine tool as shown in FIG. 9 by changing the cutting feed speed override or the time constant for acceleration/deceleration momentarily in accordance with the heating state and the temperature state of the machine too, with the result that the quality of each of machined workpieces varies. That is, there is a problem that it is impossible to satisfy both of avoidance of overheating of a motor due to a continuous operation of a program and maintenance of machining quality.

SUMMARY OF THE INVENTION

An object of the present invention is to provide a numerical controller capable of satisfying avoidance of overheating of a motor due to a continuous operation of a program and maintenance of machining quality.

A numerical controller according to the present invention is a numerical controller that performs a repetitive machining operation on a workpiece by controlling a drive unit of a machine tool based on a machining program, including a machining program execution unit that outputs a movement command that commands an operation of the drive unit based on the machining program, a detection unit that detects a machine condition of the drive unit, a machine condition recording unit that records the machine condition detected by the detection unit as a machine condition history, and an operation start determination unit that outputs a machining operation start command to the machining program execution unit. The machining program execution unit starts a machining operation based on the machining program when receiving the machining operation start command and outputs an execution completion notification to the operation start determination unit when the machining operation is completed. The operation start determination unit is configured to determine whether the machining operation based on the machining program can be started based on a current machine condition detected by the detection unit and the machine condition history recorded in the machine condition recording unit when the execution completion notification is received from the machining program execution unit, output the machining operation start command to the machining program execution unit when determined that the machining operation based on the machining program can be started, and on the other hand, monitor the machine condition acquired by the detection unit to withhold outputting of the machining operation start command until the machine condition allowing to start the machining operation based on the machining program appears, when determined that the machining operation based on the machining program cannot be started.

The machine condition detected by the detection unit may be a temperature of the drive unit. In this case, the machine condition history may include at least the temperature of the drive unit at the time when the machining operation based on the machining program performed at least last time is started and a maximum temperature of the drive unit at the time when the machining operation based on the machining program is performed last time.

In a numerical controller according to the present invention, when a repetitive machining operation based on a machining program is performed, the machining operations are performed as instructed by the machining program and therefore, the quality of work to be machined does not vary under the influence of override or time constant changes and also a waiting time is automatically adjusted between the machining programs so as to avoid overheating of a motor in accordance with a machine condition at that time and therefore, overheating of the motor does not arise even though a continuous operation is performed so that both of avoidance of overheating of the motor due to the continuous operation of the program and maintenance of machining quality can be satisfied.

BRIEF DESCRIPTION OF THE DRAWINGS

The above object and other objects and features of the present invention will become apparent from the description of embodiments below with reference to appended drawings. Among these diagrams.

DETAILED DESCRIPTION OF THE PREFERRED EMBODIMENTS

Figure 1:
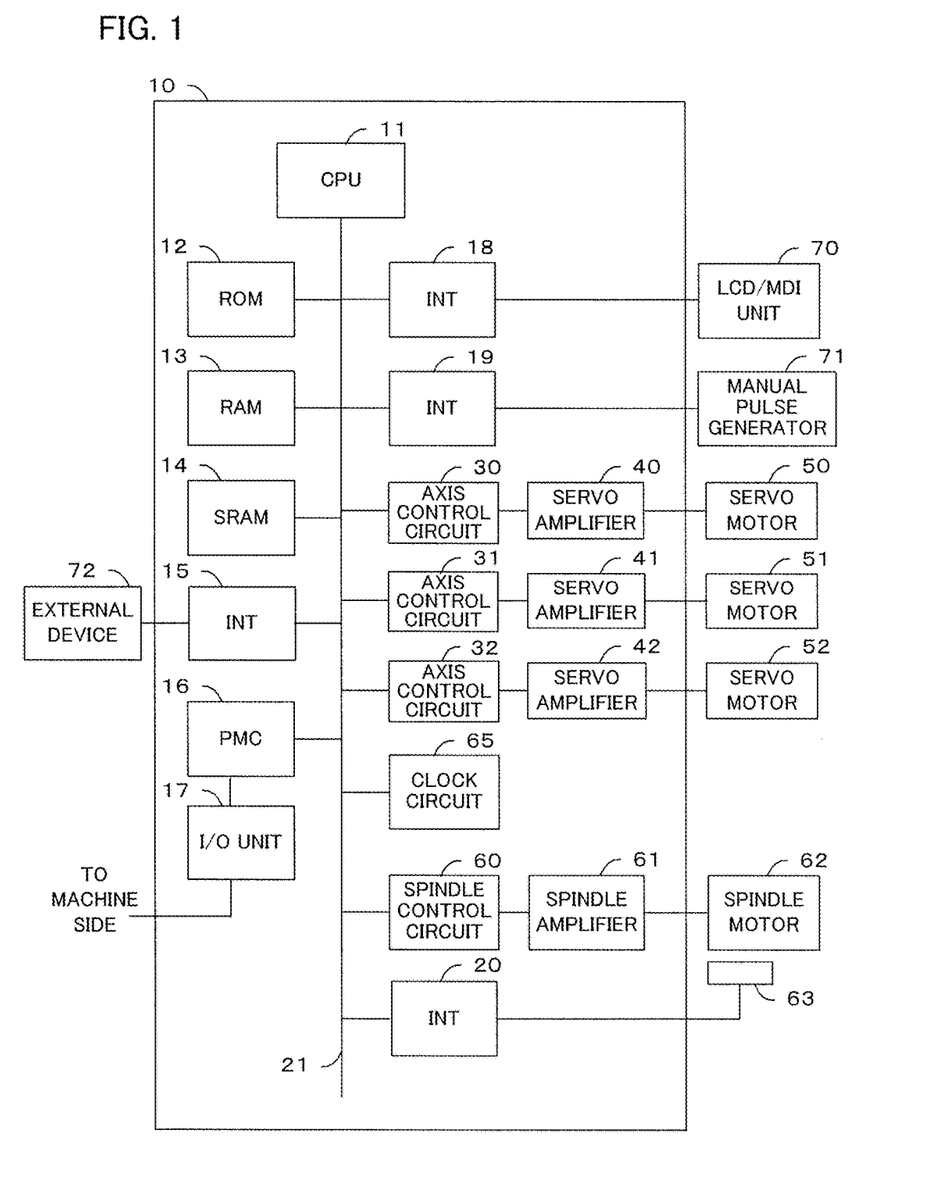
FIG. 1 is a block diagram of principal parts of a numerical controller according to the present invention.

The configuration of a numerical controller according to the present invention will be described using the block diagram in FIG. 1.

A processor (CPU) 11 reads a system program stored in a ROM 12 via a bus 21 and controls a numerical controller 10 as a whole according to the read system program. Temporary calculation data, display data, and various kinds of data input by an operator via an LCD/MDI unit 70 are stored in a RAM 13.

An SRAM 14 is configured as a nonvolatile memory in which a storage state is held even after power-off of the numerical controller 10 by being backed up by a battery (not shown) and has a program that causes the numerical controller to perform processing to determine the start of a repetitive machining operation described later, a machining program described later read via an interface 15, and a machining program input via the LCD/MDI unit 70 stored therein. In addition, various system programs to perform processing of an editing mode needed to create and edit a machining program and processing for an automatic operation are written into the ROM 12 in advance.

An external device 72 such as an external storage apparatus that can be connected to the numerical controller 10 is connected to the interface 15. A machining program or the like is read from the external device 72. A programmable machine controller (PMC) 16 is a sequence program contained in the numerical controller 10 and controls auxiliary equipment and the like on the side of the machine tool. More specifically, signals needed on the side of the auxiliary equipment are converted by the sequence program according to an M function, an S function, and a T function commanded by a machining program and output to the side of the auxiliary equipment through an I/O unit 17. Auxiliary equipments such as various actuators are operated by the output signals. In addition, the sequence program receives signals of various switches of a control panel installed on the main body of the machine tool, performs necessary processing thereon, and delivers the signals to the processor 11.

The current position of each axis of the machine tool, alarms, parameters, and image signals such as image data are sent to the LCD/MDI unit 70 to be displayed in the display thereof. The LCD/MDI unit 70 is a manual data input device including a display, a keyboard and the like and an interface 18 receives data from the keyboard of the LCD/MDI unit 70 and delivers the data to the processor 11.

An interface 19 is connected to a manual pulse generator 71 and the manual pulse generator 71 is mounted on the control panel of the machine tool and used for precise positioning of a movable part of the machine tool by controlling each axis by a distribution pulse based on a manual operation.

Axis control circuits 30, 31 of the X axis and the Y axis that move a table of the machine tool and an axis control circuit 32 of the Z axis receive a movement command of each axis from the processor 11 and output the command of each axis to servo amplifiers 40 to 42 respectively. After receiving the commands, the servo amplifiers 40 to 42 drive servo motors 50 to 52 of respective axes of the machine tool. The servo motors 50 to 52 of respective axes each contain a pulse-coder for position detection and a position signal from the pulse-coder is fed back as a pulse train.

A detection unit to detect state information of each of the servomotors 50 to 52 such as a temperature sensor (not shown) is provided in each of the servo motors 50 to 52 and configured such that the measured state information of the servo motors 50 to 52 is read by the processor 11 via an interface (not shown).

A spindle control circuit 60 receives a spindle rotation command to the machine tool and outputs a spindle speed signal to a spindle amplifier 61. After receiving the spindle speed signal, the spindle amplifier 61 rotates a spindle motor 62 of the machine tool at the commanded rotational speed to drive the tool.

A position detector 63 is coupled to the spindle motor 62 by a gear wheel, a belt or the like and outputs a feedback pulse in synchronization with the rotation of the spindle, and the feedback pulse is read by the processor 11 via an interface 20. Reference numeral 65 is a clock circuit adjusted to be synchronized with the current time.

A detection unit to detect state information of the spindle motor 62 such as a temperature sensor (not shown) is provided in the spindle motor 62 and configured such that the measured state information of the spindle motor 62 is read by the processor 11 via an interface (not shown).

Figure 2:
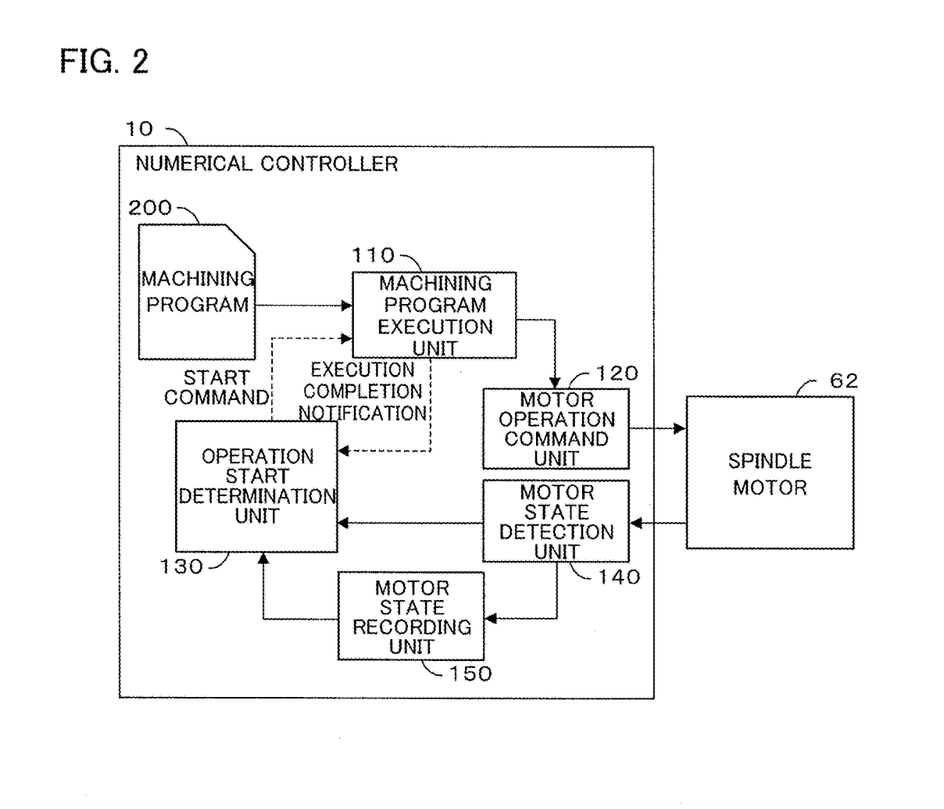
FIG. 2 a functional block diagram of the numerical controller according to the present invention.

FIG. 2 a functional block diagram of the numerical controller 10.

The numerical controller 10 includes a machining program execution unit 110, a motor operation command unit 120, an operation start determination unit 130, a motor state detection unit 140, and a motor state recording unit 150.

The machining program execution unit 110 reads a machining program 200 stored in the SRAM 14 or the like and analyzes the machining program 200 to generate a movement command of the spindle motor 62. The motor operation command unit 120 controls the operation of the spindle motor 62 based on the movement command generated by the machining program execution unit 110.

When an execution completion notification is received from the machining program execution unit, the operation start determination unit 130 performs operation start determination processing described later to determine whether to start execution of the machining program, based on the current state information of the spindle motor 62 received from the motor state detection unit 140 and a state information history received from the motor state recording unit 150, and notifies the machining program execution unit 110 of a start command of the next machining operation.

The motor state detection unit 140 acquires the current state information such as the temperature of the spindle motor 62 from the temperature sensor and the like installed in the spindle motor 62 and notifies the operation start determination unit 130 of the state information and also records the state information in the motor state recording unit 150. The motor state recording unit 150 records the state information of the spindle motor 62 by associating the state information with an execution state of the machining program in an area provided in a memory such as the RAM 13 as a state information history and provides the motor temperature of the spindle motor 62 obtained when the last machining is started, the maximum motor temperature during the last machining operation and the like in response to a request from the operation start determination unit 130.

Figure 3:
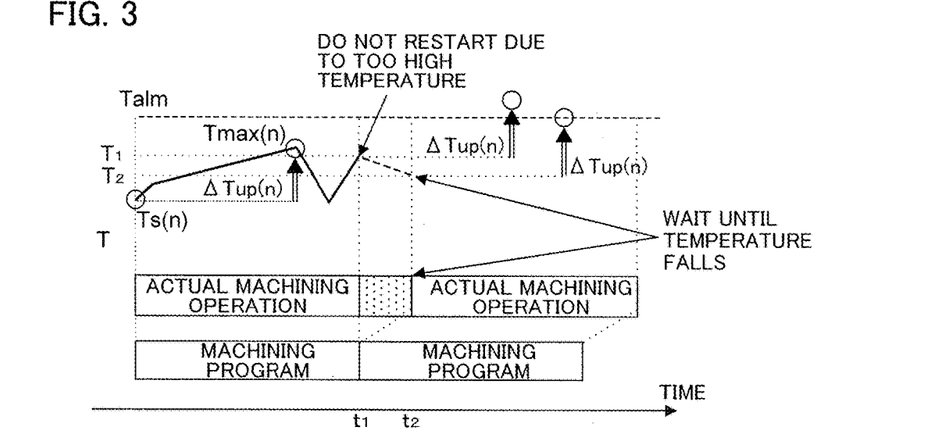
FIG. 3 is a diagram illustrating an overview of operation start determination processing (waiting time insertion processing between repetitive machining operations) performed by an operation start determination unit in the numerical controller in FIG. 2.
Figure 4:
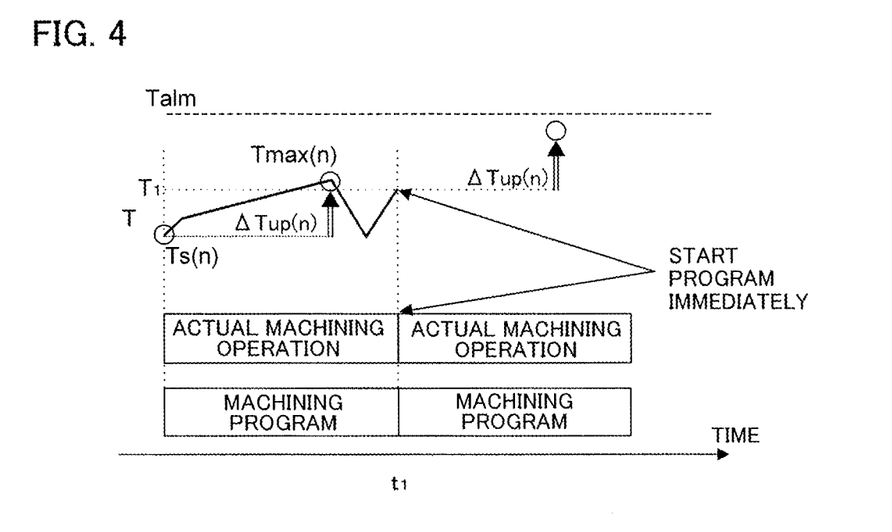
FIG. 4 is a diagram illustrating an overview of operation start determination processing (operation start processing without waiting time) performed by the operation start determination unit in the numerical controller in FIG. 2.

An overview of the operation start determination processing performed by the operation start determination unit 130 in FIG. 2 will be provided using FIGS. 3 and 4.

In the operation start determination processing performed by the operation start determination unit 130, as shown in FIG. 3, the timing of starting the next machining program execution is determined based on a motor temperature Ts (n) at the time of start of the n-th execution of the machining program, a maximum motor temperature Tmax(n) during the n-th execution of the machining program, an overheat alarm temperature Talm, and a current motor temperature T.

The motor temperature Ts(n) at the time of start of the n-th execution of the machining program and the maximum motor temperature Tmax(n) during the n-th execution of the machining program are recorded by the motor state recording unit 150 in an area provided in a memory such as the RAM 13 each time the machining program is executed based on the motor temperature acquired by the motor state detection unit 140.

Talm is stored in a set area in the SRAM 14 or like provided in advance by the LCD/MDI unit 70 being operated by an operator or the like.

FIG. 3 is a diagram illustrating an overview of operation when a waiting time is inserted before the (n+1)-th execution of the machining program is started.

When an execution completion notification of the machining program is received from the machining program execution unit 110, the operation start determination unit 130 calculates a maximum increased temperature $\Delta Tup(n)$ after the start of machining, during the n-th execution of the machining program, based on the motor temperature Ts(n) at the time of start of the last execution of the machining program, acquired from the motor state recording unit 150, and the maximum motor temperature Tmax(n) during the last execution of the machining program, from Formula (1) shown below:

$$\Delta Tup(n)=Tmax(n)-Ts(n) \tag{1}$$

In this stage, if the machining operation of the machine tool is performed based on the machining program next time, the motor temperature can be estimated to rise by $\Delta Tup(n)$ and thus, the operation start determination unit 130 next estimates whether or not the motor temperature exceeds the overheat alarm temperature Talm when the current motor temperature T rises by $\Delta Tup(n)$, from Formula (2) shown below:

$$T+\Delta Tup(n)<Talm \tag{2}$$

From Formula (2) above, if the motor temperature is estimated to exceed Talm during machining operation when the machining operation of the machine tool based on the machining program is started at the present time, the start of the next machining operation is postponed until the motor temperature T falls to a temperature that satisfies Formula (2). In FIG. 3, it is estimated that the motor temperature exceeds Talm if the temperature rises by $\Delta Tup(n)$ from the motor temperature $T_1$ at the time (time $t_1$) when the n-th execution of the machining program is completed and thus, the start of the machining program is postponed and the (n+1)-th operation of the machining program is started at the time (time $t_2$) when the motor temperature falls to $T_2$ ($T_2$ $\Delta Tup(n)<Talm$ holds).

FIG. 4 is a diagram illustrating an overview of operation in a case where execution of machining program is started without a waiting time inserted, after the n-th execution of the machining program is completed.

In FIG. 4, it is estimated that the motor temperature does not exceed Talm if the temperature rises by $\Delta Tup(n)$ from the motor temperature $T_1$ at the completion time $t_1$ of the n-th execution of the machining program and thus, the (n+1)-th operation of the machining program is started immediately.

Figure 5:
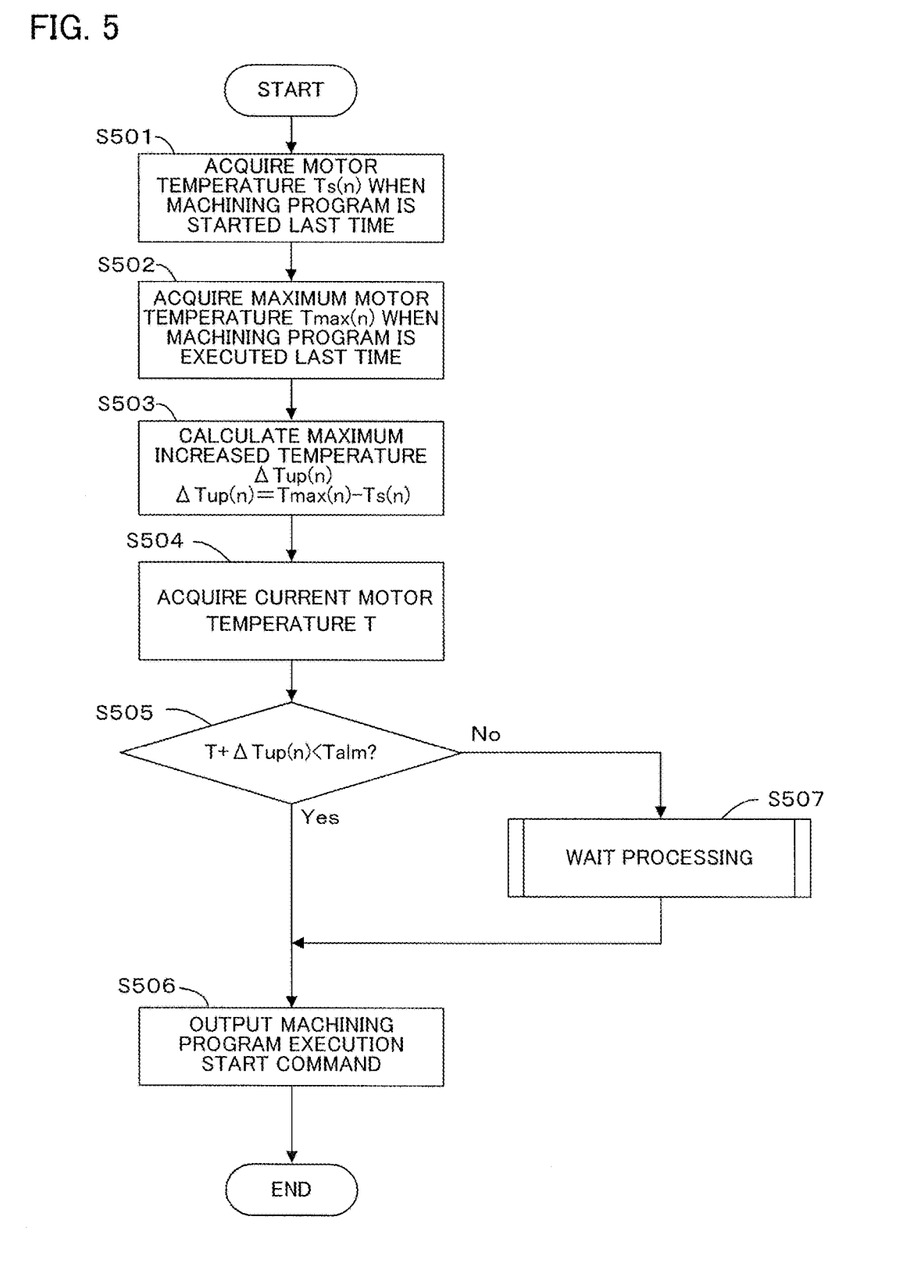
FIG. 5 is a flow chart of the operation start determination processing performed by the operation start determination unit in the numerical controller in FIG. 2.

FIG. 5 is a flow chart of the operation start determination processing performed by the operation start determination unit 130. The processing is started when an execution completion notification is received from the machining program execution unit 110.

[Step S501] The motor temperature Ts (n) at the time when the machining program is started last time is acquired from the motor state recording unit 150.

[Step S502] The maximum motor temperature Tmax(n) during the last execution of the machining program is acquired from the motor state recording unit 150.

[Step S503] The maximum increased temperature $\Delta Tup$ (n) is calculated based on Ts (n) acquired in Step S501 and Tmax (n) acquired in Step S502.

[Step S504] The current motor temperature T is acquired from the motor state detection unit 140.

[Step S505] The overheat alarm temperature Talm is acquired from setting information and it is determined whether or not Talm is larger than the sum (T+$\Delta$Tup (n)) of the current motor temperature T acquired in Step S504 and the maximum increased temperature $\Delta$Tup (n) calculated in Step S503 (in other words, whether Formula (2) holds or not). If T+$\Delta$Tup(n)<Talm holds (Yes), processing proceeds to Step S506. If T+Tup (n)<Talm does not hold (No), processing proceeds to Step S507.

[Step S506] The machining program execution unit 110 is notified of a start command to instruct the start of the next execution of the machining program, and the operation start determination processing is ended.

[Step S507] Standby processing of a predetermined time is performed.

The standby processing in Step S507 is performed by monitoring the motor temperature T acquired by the motor state detection unit 140 until the sum (T+$\Delta$Tup(n)) of the current motor temperature T and the maximum increased temperature ΔTup (n) falls below the overheat alarm temperature Talm (that is, until Formula (2) holds). Then, when the motor temperature T sufficiently falls and T<(Talm−ΔTup (n)) holds, processing proceeds from Step S505 to Step S506.

In the present embodiment, an example in which the start of operation is determined based on the motor temperature of the spindle motor 62 is shown, but the embodiment may also be configured to also record the motor temperature of each of the servo motors 50 to 52 to determine the start of operation based on the motor temperature of each motor. When configured in this manner, the operation may be started when it is estimated that none of the motors will overheat.

In the present embodiment, an example in which an operator sets the overheat alarm temperature Talm in the numerical controller 10 in advance is shown, but the embodiment may also be configured to automatically acquire the overheat alarm from each motor via an interface.

Further, when determining whether to exceed the overheat alarm temperature Talm after the operation start determination unit 130 starts to operate the machining program based on the current motor temperature T and the maximum increased temperature ΔTup (n), an offset value a taking fluctuations of the temperature rise based on the environment and the like into consideration may be introduced to determine whether to exceed the overheat alarm temperature Talm using Formula (3) shown below:

$$T + \Delta Tup(n) + \alpha < Talm \quad (3)$$

The invention claimed is:

1. A numerical controller that performs a repetitive machining operation on a workpiece by controlling a drive unit of a machine tool based on a machining program, the numerical controller including a processor configured to perform a method comprising:
    outputting a machining operation start command;
    in response to outputting the machining operation start command, starting a machining operation based on the machining program;
    outputting an execution completion notification when the machining operation is completed;
    in response to outputting the execution completion notification, determining whether the machining operation based on the machining program can be started based on (i) a current temperature of the drive unit, (ii) a temperature of the drive unit detected at the start of the most recently completed machining operation based on the machining program and (iii) a maximum temperature of the drive unit detected during the most recently completed machining operation based on the machining program, wherein determining whether the machining operation based on the machining program can be started includes
        calculating a maximum increase in temperature of the drive unit during the most recently completed machining operation based on (i) the temperature of the drive unit detected at the start of the most recently completed machining operation based on the machining program and (ii) the maximum temperature of the drive unit detected during the most recently completed machining operation based on the machining program, and
        determining whether a sum of the (i) current temperature of the drive unit and (ii) the calculated maximum increase in temperature of the drive unit during the most recently completed machining operation satisfies a threshold temperature;
    outputting the machining operation start command when it is determined that the machining operation based on the machining program can be started; and
    in response to determining that that the machining operation based on the machining program cannot be started, delaying outputting of the machining operation start command until the sum of the (i) current temperature of the drive unit and (ii) the calculated maximum increase in temperature of the drive unit during the most recently completed machining operation satisfies the threshold temperature.

2. The numerical controller according to claim 1, wherein (i) the temperature of the drive unit detected at the start of the most recently completed machining operation based on the machining program and (ii) the maximum temperature of the drive unit detected during the most recently completed machining operation based on the machining program are recorded as a machine condition history.

3. The numerical controller according to claim 1, wherein the processor is configured to perform a method further comprising:
    determining an offset value associated with at least one environmental condition of the drive unit, wherein the offset value accounts for fluctuations in a rise in temperature of the drive unit, and
    wherein determining whether the machining operation based on the machining program can be started includes determining whether a sum of the (i) current temperature of the drive unit, (ii) the calculated maximum increase in temperature of the drive unit during the most recently completed machining operation, and (iii) the determined offset value satisfies the threshold temperature.

* * * * *